(12) United States Patent
Murata

(10) Patent No.: US 8,748,002 B2
(45) Date of Patent: Jun. 10, 2014

(54) TEMPERED GLASS AND GLASS

(75) Inventor: Takashi Murata, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 330 days.

(21) Appl. No.: 13/144,537

(22) PCT Filed: Dec. 8, 2009

(86) PCT No.: PCT/JP2009/070553
§ 371 (c)(1),
(2), (4) Date: Jul. 14, 2011

(87) PCT Pub. No.: WO2010/084670
PCT Pub. Date: Jul. 29, 2010

(65) Prior Publication Data
US 2011/0274916 A1  Nov. 10, 2011

(30) Foreign Application Priority Data

Jan. 21, 2009  (JP) .................... 2009-010527

(51) Int. Cl.
*C03C 21/00* (2006.01)
*C03C 3/087* (2006.01)
*C03C 3/093* (2006.01)
*C03C 3/11* (2006.01)
C03B 17/06 (2006.01)
C03B 18/02 (2006.01)
C03B 23/023 (2006.01)

(52) U.S. Cl.
CPC .............. *C03C 21/002* (2013.01); *C03C 3/087* (2013.01); *C03C 3/093* (2013.01); *C03C 3/11* (2013.01); C03B 17/064 (2013.01); C03B 18/02 (2013.01); C03B 23/023 (2013.01)
USPC ............... 428/410; 65/30.14; 65/94; 501/56; 501/67; 501/70

(58) Field of Classification Search
None
See application file for complete search history.

(56) References Cited

U.S. PATENT DOCUMENTS

| | | | |
|---|---|---|---|
| 4,853,018 A * | 8/1989 | Koss et al. ................ | 65/94 |
| 5,589,248 A | 12/1996 | Tomozane et al. | |
| 5,702,496 A | 12/1997 | Tomozane et al. | |
| 5,785,726 A * | 7/1998 | Dorfeld et al. ............. | 65/134.1 |
| 5,824,127 A * | 10/1998 | Bange et al. ............... | 65/90 |
| 6,333,285 B1 | 12/2001 | Chopinet et al. | |
| 7,168,047 B1 | 1/2007 | Huppi | |
| 2002/0193232 A1 * | 12/2002 | Itoh et al. ................. | 501/55 |
| 2005/0065014 A1 * | 3/2005 | Narita et al. .............. | 501/66 |
| 2005/0143246 A1 * | 6/2005 | Comte et al. .............. | 501/4 |
| 2005/0209084 A1 * | 9/2005 | Takaya et al. ............. | 501/11 |
| 2006/0063009 A1 | 3/2006 | Naitou et al. | |
| 2007/0149380 A1 * | 6/2007 | Dorfeld et al. ............ | 501/55 |
| 2008/0020919 A1 | 1/2008 | Murata | |
| 2008/0127679 A1 * | 6/2008 | Nishizawa et al. ........ | 65/134.9 |
| 2009/0000335 A1 | 1/2009 | Urata et al. | |
| 2010/0035745 A1 | 2/2010 | Murata | |
| 2013/0323444 A1 * | 12/2013 | Ehemann et al. ......... | 428/34.4 |

FOREIGN PATENT DOCUMENTS

| | | |
|---|---|---|
| EP | 2 075 237 | 7/2009 |
| JP | 6-256029 | 9/1994 |
| JP | 2001-247342 | 9/2001 |
| JP | 2005-089259 | 4/2005 |
| JP | 2006-83045 | 3/2006 |
| JP | 2006-240951 | 9/2006 |
| JP | 2008-1590 | 1/2008 |
| JP | 2008-115071 | 5/2008 |
| JP | 2008-115072 | 5/2008 |
| JP | 2008-195602 | 8/2008 |
| WO | 2007/111079 | 10/2007 |

OTHER PUBLICATIONS

International Preliminary Report on Patentability and Written Opinion of the International Searching Authority issued Aug. 18, 2011 in International (PCT) Application No. PCT/JP2009/070553.

Chinese Office Action issued Oct. 23, 2012 in corresponding Chinese Application No. 200980127700.4 with English translation.

International Search Report issued Mar. 2, 2010 in International (PCT) Application No. PCT/JP2009/070553.

Tetsuro Izumitani et al., "New Glass and Physical Properties Thereof", First Edition, Management System Laboratory. Co., Ltd., Aug. 20, 1984, pp. 451-498 w/partial English translation.

* cited by examiner

*Primary Examiner* — David Sample
(74) *Attorney, Agent, or Firm* — Wenderoth, Lind & Ponack, L.L.P.

(57) ABSTRACT

A tempered glass of the present invention includes, as a glass composition, in terms of mass %, 45 to 75% of $SiO_2$, 0 to 30% of $Al_2O_3$, and 0 to 30% of $Li_2O+Na_2O+K_2O$ and has a β-OH value of 0.3 to 1/mm.

12 Claims, No Drawings

TEMPERED GLASS AND GLASS

TECHNICAL FIELD

The present invention relates to a tempered glass, and more specifically, to a tempered glass which is suitable for exterior parts for a mobile PC and the like. The present invention also relates to a glass, and more specifically, to a glass for tempering which is suitable for exterior parts for a mobile PC and the like.

BACKGROUND ART

Mobile phones equipped with a touch panel have been widely used, and a glass tempered by an ion exchange or the like (so-called tempered glass) tends to be used for the cover glass of mobile phones. Because a tempered glass is high in mechanical strength compared with an untempered glass, the tempered glass is suitable for the above-mentioned application (see Patent Document 1 and Non-patent Document 1 below).

In recent years, touch panels are being equipped for applications other than mobile phones as well, and hence, exterior parts each having a specific shape such as a curved shape are necessary depending on their applications. In order to adopt a tempered glass to those applications, it is necessary to subject the tempered glass to processing so that the tempered glass has a specific shape such as a curved shape. A tempered glass having a specific shape can be produced by forming molten glass into obtain a glass having, for example, a plate shape, then modifying the shape of the glass to a specific shape by thermal processing, and, after that, performing a tempering treatment (see Patent Documents 2 and 3 below).

Thus, those tempered glasses are required to have characteristics such as excellent thermal processability, that is, a low softening point, as well as a high mechanical strength.

Patent Document 1: JP 2006-83045 A
Patent Document 2: U.S. Pat. No. 7,168,047
Patent Document 3: JP 2001-247342 A
Non-patent Document 1: Tetsuro Izumitani et al., "New glass and physical properties thereof", First edition, Management System Laboratory. Co., Ltd., Aug. 20, 1984, pp. 451-498

SUMMARY OF THE INVENTION

Problem to be Solved by the Invention

The mechanical strength of a tempered glass can be enhanced by increasing the compression stress value of a compression stress layer formed on its surface and increasing the thickness of the compression stress layer.

However, it is difficult to lower a softening point while the compression stress value of a compression stress layer is increased and while the thickness of the compression stress layer is increased. In order that while the compression stress value of a compression stress layer is increased, the thickness of the compression stress layer is increased, it is necessary to introduce $Al_2O_3$ and the like, which are components for enhancing ion exchange performance, in a glass composition, because the introduction of those elements raises a softening point.

Thus, a technical object of the present invention is to provide a tempered glass having a specific shape such as a curved shape by creating a tempered glass having a low softening point while having a high mechanical strength.

Means for Solving the Problem

The inventors of the present invention have studied in various ways and found that the appropriate control of a β-OH value results in lowering of softening point, while securing an appropriate compression stress value and thickness of compression stress layer. Thus, the inventors propose the finding as the present invention. That is, the tempered glass of the present invention is characterized by including, as a glass composition, in terms of mass %, 45 to 75% of $SiO_2$, 0 to 30% of $Al_2O_3$, and 0 to 30% of $Li_2O+Na_2O+K_2O$ and having a β-OH value of 0.3 to 1/mm. Here, the term "β-OH value" refers to a value obtained from the following equation 1 by measuring the transmittance of the glass by FT-IR.

$$\beta\text{-OH value} = (1/X)\log 10(T_1/T_2) \quad \text{(Equation 1)}$$

X: thickness of glass (mm)
$T_1$: transmittance (%) at a reference wavelength of 3846 $cm^{-1}$
$T_2$: minimum transmittance (%) at a hydroxyl group absorption wavelength of around 3500 $cm^{-1}$ The β-OH value can be increased by, for example, (1) selecting a raw material having a high water content (for example, a hydroxide raw material), (2) adding water to the raw material, (3) reducing the addition amount of a component (such as Cl or $SO_3$) which reduces the water content in the glass, or not using such the component, (4) employing oxygen combustion during melting or introducing steam directly into a melting furnace to increase the water content in the atmosphere in the furnace, (5) carrying out steam bubbling in the molten glass, (6) using a large-sized melting furnace to melt the glass, or (7) decreasing the flow rate of the molten glass.

The tempered glass of the present invention can include, as a glass composition, 0.1 mass % or more of $Li_2O+Na_2O+K_2O$.

The tempered glass of the present invention can further include, as a glass composition, 0 to 5 mass % of $B_2O_3$.

The tempered glass of the present invention is preferable to including such a compression stress layer on the surface in that a compression stress value of the compression stress layer is 50 MPa or more, and a thickness of the compression stress layer is 10 μm or more. Here, the terms "compression stress value of a compression stress layer" and "thickness of a compression stress layer" refer to values obtained by observing the number of interference fringes and the intervals between the fringes by using a surface stress meter to calculate the compression stress value on the surface and the thickness.

The tempered glass of the present invention is preferable to having a softening point of 900° C. or less. Here, the term "softening point" refers to a value measured based on a method of ASTM C338.

The tempered glass of the present invention is preferable to having a strain point of 400° C. or more. Here, the term "strain point" refers to a value measured based on a method according to ASTM C336.

The tempered glass of the present invention is preferable to having a liquidus temperature of 1200° C. or less. Here, the term "liquidus temperature" refers to a value obtained by pulverizing the glass, placing the glass powder passing through a standard sieve of 30 mesh (mesh opening 500 μm) and remaining on 50 mesh (mesh opening 300 μm) in a platinum boat, keeping the glass powder in a temperature gradient furnace for 24 hours, and measuring a temperature at which a crystal is deposited.

The tempered glass of the present invention is preferable to having a liquidus viscosity of $10^4$ dPa·s or more. Here, the term "liquidus viscosity" refers to a value obtained by measuring the viscosity of a glass at the liquidus temperature by a platinum sphere pull up method.

The tempered glass of the present invention is preferable to having a thermal expansion coefficient of 50 to $110 \times 10^{-7}/°C$. Here, the term "thermal expansion coefficient" refers to a value measured by using a dilatometer and shows an average value in the temperature range of from 30 to 380° C.

The tempered glass of the present invention can be formed by subjecting a glass having a plate shape to thermal processing. Here, the term "thermal processing" includes the case where molten glass is directly formed into a specific shape by press molding or the like.

The tempered glass of the present invention may have a shape other than a plate shape.

The glass of the present invention is characterized by including, as a glass composition, in terms of mass %, 45 to 75% of $SiO_2$, 0 to 30% of $Al_2O_3$, and 0 to 30% of $Li_2O+Na_2O+K_2O$, and having a β-OH value of 0.3 to 1/mm.

The glass of the present invention can include, as a glass composition, 0.1 mass % or more of $Li_2O+Na_2O+K_2O$.

The glass of the present invention can further include, as a glass composition, 0 to 5 mass % of $B_2O_3$.

The glass of the present invention is preferable to having a softening point of 900° C. or less.

The glass of the present invention is preferable to having a strain point of 400° C. or more.

The glass of the present invention is preferable to having a liquidus temperature of 1200° C. or less.

The glass of the present invention is preferable to having a liquidus viscosity of $10^4$ dPa·s or more.

The glass of the present invention is preferable to having a thermal expansion coefficient of 50 to $110 \times 10^{-7}/°C$.

The glass of the present invention may have been subjected to thermal processing.

The glass of the present invention may have a shape other than a plate shape.

DESCRIPTION OF EMBODIMENTS

A method of forming a compression stress layer on the surface of a glass includes a physical tempering method and a chemical tempering method. For the tempered glass of the present invention, a compression stress layer is preferable to being formed by a chemical tempering method. The chemical tempering method is a method of introducing an alkali ion having a large ion radius onto the surface of a glass by an ion exchange at a temperature equal to or less than a strain point. When a compression stress layer is formed by the chemical tempering method, an ion exchange treatment can be performed successfully even if the thickness of the glass is small, and desired mechanical strength can be obtained. Further, when a compression stress layer is formed by the chemical tempering method, the tempered glass is hardly broken easily even if the tempered glass is cut after a tempering treatment, which is different from the case of a physical tempering method such as an air cooling tempering method.

For producing the tempered glass, a tempering treatment needs to be performed after molten glass is formed into a predetermined shape. It is desirable that the tempering treatment be performed by an ion exchange treatment as described above. The ion exchange treatment can be performed, for example, by immersing the glass in a potassium nitrate solution at 400 to 550° C. for 1 to 8 hours. It is desirable that optimum ion exchange conditions be selected in view of the viscosity property, application, and plate thickness of the glass, tensile stress in the glass, and the like.

In the tempered glass of the present invention, the lower range of a β-OH value is preferably 0.3/mm or more, more preferably 0.32/mm or more, 0.34/mm or more, 0.35/mm or more, 0.4/mm or more, 0.45/mm or more, 0.5/mm or more, or 0.55/mm or more, or particularly preferably 0.6/mm or more, and the upper range of the β-OH value is preferably 1/mm or less, more preferably 0.9/mm or less or 0.8/mm or less, or particularly preferably 0.7/mm or less. When the β-OH value is less than 0.3/mm, lowering a softening point becomes difficult, resulting in a difficulty in performing thermal processing, or even if thermal processing is performed, loading on a mold becomes large, and hence, the life time of the mold is shortened. As a result, production cost of the tempered glass is largely increased. On the other hand, when the β-OH value is more than 1/mm, the network structure of glass is readily damaged, resulting in easy alleviation of stress, and hence, enhancing the mechanical strength of the tempered glass becomes difficult. That is, when the network structure of glass is damaged, the compression stress of the compression stress layer is easily relaxed during an ion exchange treatment, resulting in a difficulty in increasing the compression stress value of the compression stress layer.

In the tempered glass of the present invention, it is preferred that aluminum hydroxide, hydrous zirconium oxide, and the like be used. If those are used, the β-OH value can be increased while the dissolvability of a glass batch is promoted. Improving ion exchange performance requires much use of materials poorly dissolved such as $Al_2O_3$, $ZrO_2$, and $TiO_2$, but when those materials are used in large amounts, $Al_2O_3$ poorly dissolved and the like easily flow out as undissolved glass stones. However, when aluminum hydroxide, hydrous zirconium oxide, and the like are used, the dissolvability of a glass batch can be enhanced, and hence, production of undissolved glass stones of $Al_2O_3$ poorly dissolved and the like can be prevented.

In the tempered glass of the present invention, the compression stress value of the compression stress layer is preferably 50 MPa or more, 100 MPa or more, 300 MPa or more, 500 MPa or more, 600 MPa or more, and particularly preferably 700 MPa or more. As the compression stress value of the compression stress layer increases, the mechanical strength of the tempered glass becomes higher. Meanwhile, when extremely large compression stress is generated on the surface, a micro-crack is produced on the surface, with the result that the mechanical strength of the tempered glass may be reduced adversely. Further, when extremely large compression stress is generated on the surface, tensile stress in the glass may become extremely high. Therefore, the compression stress of the compression stress layer is preferably set to 1300 MPa or less. It should be noted that the compression stress value of the compression stress layer may be increased by increasing the contents of $Al_2O_3$, $TiO_2$, $ZrO_2$, MgO, and ZnO, decreasing the contents of SrO and BaO, shortening the ion exchange time, or reducing the ion exchange temperature.

When the tempered glass is mounted on a touch panel, end users have increased chances of touching the surface of the tempered glass with their fingers, and hence, the mechanical strength of the tempered glass tend to decrease due to flaws on the surface and the like. In order to maintain the mechanical strength of the tempered glass, increasing the thickness of the compression stress layer is effective. In the tempered glass of the present invention, the thickness of the compression stress layer is preferably 10 μm or more, 20 μm or more, 30 μm or more, 40 μm or more, or 50 μm or more, or particularly preferably 60 μm or more. As the thickness of the compression stress layer is larger, the tempered glass is more difficult to break even if the tempered glass has a deep flaw. On the other hand, when the thickness of the compression stress layer is too large, cutting and processing the tempered glass become more difficult. Therefore, the thickness of the compression stress layer is preferably 200 µm or less. It should be noted that the thickness of the compression stress layer may be increased by increasing the contents of $Al_2O_3$, $K_2O$, $TiO_2$, $ZrO_2$, MgO, and ZnO, decreasing the contents of SrO and BaO, lengthening the ion exchange time, or raising the ion exchange temperature.

In the tempered glass of the present invention, the tensile stress value in the glass calculated with the following mathematical equation 2 is preferably 200 MPa or less, 150 MPa or less, 100 MPa or less, or particularly 50 MPa or less. As the tensile stress value in the glass becomes smaller, the probability that the tempered glass is broken due to a defect in the glass becomes lower. However, when the tensile stress value in the glass is set to be extremely small, the compression stress value and thickness of the compression stress layer on the surface become small. Therefore, the tensile stress value in the glass is preferably 1 MPa or more, 10 MPa or more, or particularly preferably 15 MPa or more.

Tensile stress value in glass=(compression stress value of compression stress layer×thickness of compression stress layer)/(thickness of tempered glass−thickness of compression stress layer×2)   (Equation 2)

The tempered glass of the present invention contains, as a glass composition, in terms of mass %, 45 to 75% of $SiO_2$, 0 to 30% of $Al_2O_3$, and 0 to 30% of $Li_2O+Na_2O+K_2O$. In the tempered glass of the present invention, the reason that the glass composition is limited to the above is given below.

$SiO_2$ is a component for forming a network of the glass, and the content is 45 to 75%, preferably 50 to 70%, more preferably 50 to 63%, still more preferably 52 to 63%, particularly preferably 52 to 60%. When the content of $SiO_2$ is too large, meltability and formability of the glass decrease, and, in addition, the thermal expansion coefficient becomes too small, and matching of the thermal expansion coefficient with those of peripheral materials becomes difficult. On the other hand, when the content of $SiO_2$ is too small, glass formation becomes difficult. Further, the thermal expansion coefficient becomes too high, and the thermal shock resistance of the glass tends to lower.

$Al_2O_3$ is a component for enhancing ion exchange performance, also has an effect of enhancing the strain point and the Young's modulus, and the content is 0 to 30%. When the content of $Al_2O_3$ is too large, a devitrified crystal tends to deposit in the glass, and the formability tends to be low and in particular, it becomes difficult to form a glass having a plate shape by an overflow down draw method and the like. Further, when the content of $Al_2O_3$ is too large, the thermal expansion coefficient becomes too small, matching of the thermal expansion coefficient with those of peripheral materials becomes difficult, and the viscosity becomes too high, with the result that it becomes difficult to melt the glass. In addition, the softening point becomes too high, the temperature for thermal processing becomes too high, and in particular, the temperature during the press molding becomes too high. Therefore, the deterioration of a mold may be accelerated. On the other hand, when the content of $Al_2O_3$ is too small, the ion exchange performance may not be exhibited sufficiently. Comprehensively understanding the above-mentioned viewpoints, the upper range of $Al_2O_3$ is preferably 25% or less, 23% or less, 22% or less, 20% or less, 19% or less, 18% or less, or 17% or less, or particularly preferably 16.5% or less. The lower range of $Al_2O_3$ is preferably 3% or more, 5% or more, 10% or more, 12% or more, or 13% or more, or particularly preferably 14% or more.

$Li_2O+Na_2O+K_2O$ is an ion exchange component, and also is a component for lowering the viscosity to improve the meltability and the formability. When the content of $Li_2O+Na_2O+K_2O$ is too large, the glass tends to be devitrified. In addition, the thermal expansion coefficient increases too much, and hence, the thermal shock resistance lowers, and matching of the thermal expansion coefficient with those of peripheral materials becomes difficult. Further, when the content of $Li_2O+Na_2O+K_2O$ is too large, the strain point decreases too much, and thus, the compression stress value may be hardly increased. In addition, when the content of $Li_2O+Na_2O+K_2O$ is too large, the viscosity at around the liquidus temperature lowers, whereby it may be difficult to ensure a high liquidus viscosity. Therefore, the content of $Li_2O+Na_2O+K_2O$ is preferably 30% or less, 25% or less, or particularly preferably 20% or less. On the other hand, when the content of $Li_2O+Na_2O+K_2O$ is too small, the ion exchange performance and the meltability may decrease, and the softening point may become unreasonably high. Therefore, the content of $Li_2O+Na_2O+K_2O$ is preferably 0.1% or more, 8% or more, 10% or more, or 13% or more, or particularly 15% or more.

$Li_2O$ is an ion exchange component, which also lowers the viscosity to improve the meltability and the formability. Further, $Li_2O$ is a component for enhancing the Young's modulus. In addition, $Li_2O$ has a high effect of enhancing the compression stress value, among alkali metal oxides. However, when the content of $Li_2O$ is too large, the liquidus viscosity lowers and the glass tends to be devitrified, and, in addition, the thermal expansion coefficient increases too much, and hence, the thermal shock resistance lowers and matching of the thermal expansion coefficient with those of peripheral materials becomes difficult. Further, when the content of $Li_2O$ is too large, the low-temperature viscosity, and in particular, strain point lower too much, and hence, stress relaxation tends to occur, and the compression stress value, on the contrary, lowers in some cases. Thus, the content of $Li_2O$ is preferably 0 to 10%, 0 to 8%, 0 to 6%, 0 to 4%, 0 to 3%, 0 to 2%, 0 to 1%, or 0 to 0.5%, or particularly preferably 0 to 0.1%.

$Na_2O$ is an ion exchange component, which also lowers the viscosity to improve the meltability and the formability and improve the devitrification resistance. The content of $Na_2O$ is preferably 0 to 20%, 8 to 16%, 8 to 15%, 9 to 15%, 10 to 15%, or 11 to 15%, or particularly preferably 12 to 15%. When the content of $Na_2O$ is too large, the thermal expansion coefficient becomes too large, and hence, the thermal shock resistance lowers, and matching of the thermal expansion coefficient with those of peripheral materials becomes difficult. In addition, when the content of $Na_2O$ is too large, the strain point lowers and a balance of the glass composition is deteriorated, with the result that, on the contrary, the devitrification resistance tends to be deteriorated. On the other hand, when the content of $Na_2O$ is too small, the meltability lowers, the thermal expansion coefficient lowers too much, and the ion exchange performance tends to be deteriorated.

$K_2O$ is a component for enhancing ion exchange performance, and shows a high effect of increasing the thickness of a compression stress layer, among alkali metal oxides. In addition, $K_2O$ is a component for lowering the viscosity to enhance the meltability and the formability. Further, $K_2O$ is also a component for improving the denitrification resistance. When the content of $K_2O$ is too large, the thermal expansion coefficient becomes too large, and hence, the thermal shock resistance lowers, and matching of the thermal expansion coefficient with those of peripheral materials becomes difficult. Further, when the content of $K_2O$ is too large, there are tendencies that the strain point lowers, and a balance of the glass composition is deteriorated, with the result that, on the contrary, the denitrification resistance tends to be deteriorated. Taking the above points into consideration, the content of $K_2O$ is preferably 0 to 10% and the upper range of the $K_2O$ is preferably 8% or less, 7% or less, or 6% or less, or particularly preferably 5% or less. Taking the thickness of the compression stress layer into consideration, the lower range of $K_2O$ is preferably 0.1% or more, 0.5% or more, or 1% or more, or particularly preferably 2% or more.

In addition to the above components, the following components can be added to the glass composition.

$B_2O_3$ is a component that has the effects of reducing the liquidus temperature, viscosity, and density and improves ion exchange performance, especially the compression stress value. The content of $B_2O_3$ is preferably 0 to 10%, 0 to 5%, or 0 to 3%, or particularly preferably 0 to 2%. When the content of $B_2O_3$ is excessive, the surface may be stained by an ion exchange, the water resistance may degrade, or the liquidus viscosity may lower. In particular, when alkali metal oxides are incorporated into the glass composition in the tempered glass of the present invention, the excessive content of $B_2O_3$ results in remarkable erosion of a refractory in a melting furnace by the $B_2O_3$ component and alkali component in the glass during a melting process. As a result, the life time of a furnace may be shortened. Further, the excessive content of $B_2O_3$ results in the tendency of a smaller thickness of a compression stress layer.

MgO+CaO+SrO+BaO (total content of MgO, CaO, SrO, and BaO) is a component for reducing the viscosity to improve the meltability and formability and increasing the strain point or Young's modulus. The content of MgO+CaO+SrO+BaO is preferably 0 to 15%, 0 to 10%, or 0 to 6%, or particularly 0 to 5%. However, when the total content of MgO+CaO+SrO+BaO is too large, the density or thermal expansion coefficient becomes too high, the denitrification resistance degrades, and the ion exchange performance is apt to lower.

MgO is a component which lowers the viscosity to enhance the meltability and the formability, or to enhance the strain point and the Young's modulus, and particularly shows a high effect of improving the ion exchange performance, among alkali earth metal oxides. The content of MgO is preferably 0 to 10%, 0 to 6%, or 0 to 4%, or particularly preferably 0 to 3%. However, when the content of MgO is too large, the density and the thermal expansion coefficient becomes too high, and the glass tends to be devitrified.

CaO is a component which lowers the viscosity to enhance the meltability and the formability, or to enhance the strain point and the Young's modulus, and particularly shows a high effect of improving the ion exchange performance, among alkali earth metal oxides. The content of CaO is preferably 0 to 10%, 0 to 8%, or 0 to 6%, and particularly preferably 0 to 3%. However, when the content of CaO is too large, the density and the thermal expansion coefficient becomes too high, the glass tends to be devitrified, and the balance of the glass composition may deteriorate, and on the contrary, the ion exchange performance deteriorates in some cases.

When the content of SrO+BaO (total content of SrO and BaO) is preferably 0 to 5%, 0 to 3%, 0 to 2.5%, 0 to 2%, or 0 to 1%, or particularly preferably 0 to 0.1%. When the content of SrO+BaO is limited to the above range, the ion exchange performance is effectively improved. It should be noted that, because SrO+BaO has the function of inhibiting an ion exchange reaction, when the content of SrO+BaO is excessively high, the mechanical strength of the tempered glass is hardly increased.

SrO is a component that lowers the viscosity to enhance the meltability and formability or to enhance the strain point and Young's modulus, and the content thereof is preferably 0 to 5%. BaO is a component that lowers the viscosity to enhance the meltability and formability or to enhance the strain point and Young's modulus, and the content thereof is preferably 0 to 5%. When the content of SrO or BaO is too large, the ion exchange performance tends to deteriorate. Further, the density and the thermal expansion coefficient become too large, and the glass tends to be devitrified. In particular, the content of SrO is desirably 3% or less, 2% or less, 1% or less, or 0.5% or less, or particularly desirably 0.1% or less. Further, the content of BaO is desirably 3% or less, 2% or less, 1% or less, 0.8% or less, or 0.5% or less, or particularly desirably 0.1% or less.

When the value obtained by dividing the total content of MgO+CaO+SrO+BaO by the total content of $Li_2O+Na_2O+K_2O$, that is, the value (MgO+CaO+SrO+BaO)/($Li_2O+Na_2O+K_2O$) is large, the denitrification resistance tends to be deteriorated. Therefore, the value (MgO+CaO+SrO+BaO)/($Li_2O+Na_2O+K_2O$) is preferably 0.5 or less or 0.4 or less, or particularly preferably 0.3 or less.

ZnO is a component which improves the ion exchange performance, and in particular, component which enhances the compression stress value. Further, ZnO is a component which lowers the viscosity without lowering the low-temperature viscosity, and the content thereof is preferably 0 to 10%, 0 to 5%, or 0 to 3%, or particularly preferably 0 to 1%. However, when the content of ZnO becomes too large, the glass manifests phase separation, the devitrification resistance lowers, and the density is apt to become large.

$ZrO_2$ is a component for improving the ion exchange performance markedly and increasing the viscosity around the liquidus viscosity and strain point. The content of $ZrO_2$ is preferably 0 to 10%, 0 to 9%, 0.001 to 8%, 0.01 to 7%, 1 to 7%, 2 to 7%, or 3 to 6%, or particularly preferably 3 to 5%. When the content of $ZrO_2$ is too high, the devitrification resistance may lower extremely.

$TiO_2$ is a component for improving the ion exchange performance and reducing the viscosity. When the content of $TiO_2$ is too high, the glass is colored or the devitrification resistance lowers. Therefore, the content of $TiO_2$ is preferably 1% or less or 0.5% or less, or particularly preferably 0.1% or less.

$P_2O_5$ is a component which improves the ion exchange performance, and in particular, a component which increases the thickness of the compression stress layer, and the content thereof is preferably 0 to 8%, 5% or less, 4% or less, 2% or less, or 0.5% or less, or particularly preferably 0.1% or less. However, when the content of $P_2O_5$ is too large, the glass develops phase separation, and the water resistance is apt to be lowered.

As a fining agent, one kind or two or more kinds selected from the group consisting of $As_2O_3$, $Sb_2O_3$, $CeO_2$, $SnO_2$, F, Cl, and $SO_3$ may be added in an amount of 0 to 3%. It should be noted that it is preferred, when possible, to refrain from the use of $As_2O_3$, $Sb_2O_3$, and F, in particular, $As_2O_3$ and $Sb_2O_3$ in view of environment aspect, and each content thereof is preferably less than 0.1%. $SnO_2$, $SO_3$, and Cl are preferred fining agents. The content of $SnO_2$ is preferably 0 to 1% or 0.01 to 0.5%, or particularly preferably 0.05 to 0.4%. When the content of $SnO_2$ is more than 1%, the denitrification resistance easily lowers. The content of $SO_3$ is preferably 0 to 0.1%, 0.0001 to 0.1%, 0.0003 to 0.08%, or 0.0005 to 0.05%, or particularly preferably 0.001 to 0.03%. When the content of $SO_3$ is more than 0.1%, $SO_3$ reboils during the melting process, thereby quality in bubble existing in glass tends to be deteriorated. The content of Cl is preferably 0 to 0.5%, 0.001 to 0.1%, 0.001 to 0.09%, or 0.001 to 0.05%, or particularly preferably 0.001 to 0.03%. When the content of Cl is more than 0.5%, metal wiring is readily eroded at the time of forming a metal wiring pattern or the like on the tempered glass as well as raising the β-OH value becomes difficult.

Rare earth oxides such as $Nb_2O_5$ and $La_2O_3$ are components for enhancing the Young's modulus. However, the cost of the raw material itself is high, and when the rare earth oxides are contained in a large amount, the denitrification resistance is apt to deteriorate. Therefore, the content of the rare earth oxides is preferably 3% or less, 2% or less, 1% or less, or 0.5% or less, or particularly preferably 0.1% or less.

Because oxides of transition metals such as Co and Ni are components which cause intense coloration of glass, and lower the transmittance, it is desired that the use amount of raw materials and/or cullet of the glass be adjusted so that the content of the oxides of transition metals falls within the content ranges of preferably 0.5% or less or 0.1% or less, or particularly preferably 0.05% or less.

It is preferred to use PbO and $Bi_2O_3$ in an amount as small as possible from the environmental viewpoints, and the content thereof is preferably less than 0.1%.

The tempered glass of the present invention has a strain point of preferably 450° C. or more, 460° C. or more, or 480° C. or more, or particularly preferably 500° C. or more. The higher the strain point, the more heat resistance is improved, and hence, even if the tempered glass is subjected to a thermal treatment, the compression stress layer does not disappear easily. Further, when the strain point is high, stress relaxation does not occur easily during an ion exchange treatment, with the result that a high compression stress value can be easily obtained. In addition, when the strain point is high, the temperature-lowering rate can be increased during the temperature-lowering process after thermal processing, and hence, the process time of the thermal processing can be shortened and productivity can be enhanced. It should be noted that, in order to increase the strain point, it is recommended that the content of alkali metal oxides in the glass composition be decreased, and in particular, the content of $Li_2O$ be decreased, or the content of alkali earth metal oxides, $Al_2O_3$, $ZrO_2$, or $P_2O_5$, be increased in the glass composition.

The tempered glass of the present invention has a softening point of preferably 900° C. or less, 880° C. or less, 860° C. or less, 850° C. or less, 840° C. or less, 830° C. or less, 820° C. or less, 800° C. or less, 780° C. or less, or 770° C. or less, or particularly preferably 760° C. or less. The lower the softening point, the lower temperature the thermal processing can be performed at. In addition, the lower the softening point, the less the loading on a mold becomes when press molding is performed. Deterioration of a mold is often caused by a so-called oxidation reaction that is a reaction between metal materials used in a mold and oxygen in the air. The oxidation reaction allows the formation of a reaction product on the surface of the mold. As a result, press molding does not provide a predetermined shape in some cases. Further, the oxidation reaction allows the reduction of ions in the glass, producing bubbles in some cases. The lower the press molding temperature, i.e., the lower the softening point, the more the oxidation reaction can be suppressed. Further, the lower the softening point, the lower the upper values of the press molding temperature and thermal processing temperature are made, and hence, the time of an annealing process carried out afterward can be shorted.

In the tempered glass of the present invention, the temperature corresponding to a viscosity of $10^{2.5}$ dPa·s is preferably 1600° C. or less, 1550° C. or less, 1500° C. or less, 1450° C. or less, 1430° C. or less, or 1420° C. or less, and particularly preferably 1400° C. or less. When the temperature corresponding to the viscosity of $10^{2.5}$ dPa·s is lower, during melting, burden on a production facility such as a melting kiln is smaller, and the bubble quality of the glass can be improved. That is, when the temperature corresponding to the viscosity of $10^{2.5}$ dPa·s is lower, the glass can be produced at lower cost. It should be noted that the temperature corresponding to the viscosity of $10^{2.5}$ dPa·s corresponds to the melting temperature, and when the temperature corresponding to the viscosity of $10^{2.5}$ dPa·s is lower, the glass can be melted at a lower temperature. To reduce the temperature corresponding to the viscosity of $10^{2.5}$ dPa·s, the contents of an alkali metal oxide, an alkali earth metal oxide, ZnO, $B_2O_3$, and $TiO_2$ may be increased or the contents of $SiO_2$ and $Al_2O_3$ may be reduced.

The density of the tempered glass of the present invention is preferably 2.7 g/cm³ or less or 2.6 g/cm³ or less, and particularly preferably 2.55 g/cm³ or less. As the density becomes lower, the weight of the glass can be made lighter. The term "density" is a value measured by a known Archimedes method. To reduce the density, the contents of $SiO_2$, $P_2O_5$, and $B_2O_3$ in the glass composition may be increased or the contents of an alkali metal oxide, an alkali earth metal oxide, ZnO, $ZrO_2$, and $TiO_2$ may be reduced.

The thermal expansion coefficient of the tempered glass of the present invention is preferably 50 to $110\times10^{-7}$/° C., 70 to $110\times10^{-7}$/° C., or 75 to $105\times10^{-7}$/° C., and particularly preferably 80 to $105\times10^{-7}$/° C. When the thermal expansion coefficient falls within the above range, it becomes easier to match with the thermal expansion coefficient of a member such as a metal or an organic adhesive, thereby making it possible to prevent the separation of the member such as a metal or an organic adhesive. It should be noted that the thermal expansion coefficient is increased when the content of an alkali metal oxide or an alkali earth metal oxide in the glass composition is increased, whereas, the thermal expansion coefficient is reduced when the content of an alkali metal oxide or an alkali earth metal oxide in the glass composition is reduced.

In the tempered glass of the present invention, it is preferred that the liquidus temperature be 1200° C. or less, 1050° C. or less, 1000° C. or less, 950° C. or less, or 900° C. or less, and in particular, 860° C. or less. To reduce the liquidus temperature, the contents of $Na_2O$, $K_2O$, and $B_2O_3$ in the glass composition may be increased or the contents of $Al_2O_3$, $Li_2O$, MgO, ZnO, $TiO_2$, and $ZrO_2$ may be reduced.

In the tempered glass of the present invention, the liquidus viscosity is preferably $10^{4.0}$ dPa·s or more, $10^{4.5}$ dPa·s or more, $10^{5.0}$ dPa·s or more, $10^{5.2}$ dPa·s or more, $10^{5.3}$ dPa·s or more, $10^{5.5}$ dPa·s or more, $10^{5.7}$ dPa·s or more, or $10^{5.8}$ dPa·s or more, and particularly preferably $10^{6.0}$ dPa·s or more. To raise the liquidus viscosity, the contents of $Na_2O$ and $K_2O$ in the glass composition may be increased or the contents of $Al_2O_3$, $Li_2O$, MgO, ZnO, $TiO_2$ and $ZrO_2$ may be reduced. It should be noted that the higher the liquidus viscosity, the more the devitrification resistance and the formability are improved. Further, the lower the liquidus temperature, the more the devitrification resistance and the formability are improved. That is, the higher the liquidus viscosity, or the lower the liquidus temperature, the more difficult the precipitation of crystals from the glass becomes, and hence, thermal processing can be carried out at low temperatures.

The suitable content range and suitable characteristic value of each component can be appropriately selected and used as a preferred aspect. Of those, the following aspects are more preferred as the tempered glass of the present invention.

(1) A glass composition containing, in terms of mass %, 45 to 75% of $SiO_2$, 0 to 30% of $Al_2O_3$, and 0 to 30% of $Li_2O+Na_2O+K_2O$, and having a β-OH value of 0.3 to 1/mm.
(2) A glass composition containing, in terms of mass %, 45 to 75% of $SiO_2$, 0 to 30% of $Al_2O_3$, 0 to 4% of $B_2O_3$, and 0 to 30% of $Li_2O+Na_2O+K_2O$, and having a β-OH value of 0.3 to 1/mm.
(3) A glass composition containing, in terms of mass %, 45 to 75% of $SiO_2$, 0 to 30% of $Al_2O_3$, 0 to 5% of $B_2O_3$, and 0.1 to 30% of $Li_2O+Na_2O+K_2O$, and having a β-OH value of 0.3 to 1/mm.
(4) A glass composition containing, in terms of mass %, 45 to 75% of $SiO_2$, 0 to 30% of $Al_2O_3$, 0 to 5% of $B_2O_3$, 0.1 to 30% of $Li_2O+Na_2O+K_2O$, and 0 to 0.1% of Cl, and having a β-OH value of 0.3 to 1/mm.
(5) A glass composition containing, in terms of mass %, 45 to 75% of $SiO_2$, 0 to 30% of $Al_2O_3$, 0 to 5% of $B_2O_3$, and 0.1 to 30% of $Li_2O+Na_2O+K_2O$, and 0 to 0.01% of Cl, and having a β-OH value of 0.2 to 1/mm.
(6) A glass composition containing, in terms of mass %, 45 to 75% of $SiO_2$, 0 to 30% of $Al_2O_3$, 0 to 30% of $Li_2O+Na_2O+K_2O$, and 0 to 0.01% of Cl, and having a β-OH value of 0.3 to 1/mm.
(7) A glass composition containing, in terms of mass %, 50 to 75% of $SiO_2$, 10 to 20% of $Al_2O_3$, 0 to 5% of $B_2O_3$, 0 to 10% of $Li_2O$, 10 to 20% of $Na_2O$, 1 to 10% of $K_2O$, 0.1 to 10% of CaO, 0 to 5% of SrO, 0 to 5% of BaO, 0 to 0.5% of $TiO_2$, and 0 to 0.01% of Cl, and having a β-OH value of 0.3 to 1/mm.
(8) A glass composition containing, in terms of mass %, 50 to 60% of $SiO_2$, 12 to 18% of $Al_2O_3$, 0 to 3% of $B_2O_3$, 0 to 1% of $Li_2O$, 10 to 20% of $Na_2O$, 1 to 7% of $K_2O$, 0.1 to 10% of CaO, 0 to 5% of SrO, 0 to 5% of BaO, 0 to 0.5% of $TiO_2$, and 0 to 0.04% of Cl, and having a β-OH value of 0.3 to 1/mm.
(9) A glass composition containing, in terms of mass %, 50 to 60% of $SiO_2$, 12 to 18% of $Al_2O_3$, 0 to 3% of $B_2O_3$, 0 to 1% of $Li_2O$, 10 to 20% of $Na_2O$, 1 to 7% of $K_2O$, 0.1 to 10% of CaO, 0 to 5% of SrO, 0 to 5% of BaO, 0 to 0.5% of $TiO_2$, and 0 to 0.04% of Cl, and having a β-OH value of 0.45 to 1/mm.

When using as an exterior part, in order to maintain the mechanical strength of the tempered glass, the thickness of the tempered glass is preferably 0.3 mm or more, 0.5 mm or more, 0.7 mm or more, 1.0 mm or more, or 1.3 mm or more, and particularly preferably 1.5 mm or more. When using as a substrate, to reduce the weight of the tempered glass, the plate thickness of the tempered glass is preferably 3.0 mm or less, 1.5 mm or less, 0.7 mm or less, or 0.5 mm or less, and particularly preferably 0.3 mm or less.

The tempered glass of the present invention preferably has an unpolished surface, and the average surface roughness (Ra) of the unpolished surface is preferably 10 Å or less or 5 Å or less, and particularly preferably 2 Å or less. When using the tempered glass as an exterior part having such surface configuration, an appropriate gloss may be imparted to the tempered glass. The term "average surface roughness (Ra)" is a value measured with a method in accordance with the "method of measuring the surface roughness of an FPD glass substrate" specified in SEMI D7-97. Although the theoretical strength of glass is inherently very high, glass is broken even with much lower stress than the theoretical strength in many cases. This is because a small defect called "Griffith flaw" is produced on the surface of the glass in the step after the forming of molten glass, for example, in the polishing step. When the surface is unpolished, the inherent mechanical strength of the glass is hardly impaired, and the glass is hardly broken. When the entire surface (excluding a cut surface) is unpolished, the glass is more hardly broken. Further, when the surface is unpolished, the polishing step can be eliminated, thereby making it possible to reduce the production cost of the tempered glass. In the tempered glass of the present invention, to prevent breakage from the cut surface, the cut surface may be chamfered, for example. It should be noted that an unpolished plate-shaped glass having high surface accuracy can be obtained when forming of the molten glass is carried out by the overflow down-draw method.

The tempered glass of the present invention is preferably formed by subjecting a glass having a plate shape to thermal processing. The thermal processing allows easy production of a tempered glass having a specific shape, and as a result, cost reduction of exterior parts can be sought.

The tempered glass of the present invention preferably has a shape other than a plate shape, and, for example, preferably has a curved shape, a bumpy shape, a wave shape, a stepped shape, or the like. If the tempered glass has any of those shapes, exterior parts having a specific shape can be applied to some devices equipped with a touch panel.

The tempered glass of the present invention can be produced by placing a glass batch which is prepared to have a predetermined glass composition in a continuous melting furnace, melting the glass batch by heating at 1500 to 1600° C., fining the resultant, feeding the resultant to a forming apparatus, and forming the molten glass, and annealing the glass.

In the tempered glass of the present invention, various forming methods can be adopted. For example, there may be adopted forming methods, such as down-draw methods (e.g. an overflow down-draw method, a slot down method, and a re-draw method), a float method, and a roll out method. In addition, the glass may be directly formed into a curved shape by press forming.

The tempered glass of the present invention is preferably formed into a plate-shaped glass by an overflow down-draw method. In this way, a plate-shaped glass which is not polished and has good surface quality can be produced. The reason therefor is because in the case of adopting the overflow down-draw method, a surface to be formed of the glass does not come in contact with a trough-shaped refractory, and is formed in the state of free surface. Here, the overflow down-draw method is such that a molten glass is allowed to overflow from both sides of a heat-resistant trough, and the overflown molten glasses are down-drawn downwardly while combining them at the lower end of the trough, to thereby produce a plate-shaped glass. The structure and material of the trough are not particularly limited as long as they provide desired size and surface accuracy of the glass and can realize desired quality. Further, any method may be used to apply force to the glass to perform downward down-draw. For example, there may be adopted a method involving rotating a heat resistant roll having sufficiently large width in the state of being in contact with a glass, to thereby draw the glass, and a method involving allowing several pairs of heat resistant rolls to come into contact with only a vicinity of end surfaces of the glass to thereby draw the glass.

The glass of the present invention is characterized by containing, as a glass composition, in terms of mass %, 45 to 75% of $SiO_2$, 0 to 30% of $Al_2O_3$, and 0 to 30% of $Li_2O+Na_2O+K_2O$ and having a β-OH value of 0.3 to 1/mm. If the glass is made in such a way as described above, the thermal processability of the glass can be improved while its ion exchange performance is improved. In addition, the glass of the present invention can be provided with technical characteristics (suitable glass composition range, suitable properties, remarkable effects, and the like) similar to those of the tempered glass of the present invention. Here, the description of the technical characteristics is omitted for convenience sake.

EXAMPLES

Hereinafter, the present invention is described in detail according to examples. Tables 1 and 2 show examples of the present invention (Nos. 1 to 8).

introduction materials was changed) to achieve the glass composition and the β-OH value shown in the tables, and the resultant was melted at 1580° C. for 8 hours by using a platinum pot. Next, the molten glass was poured onto a carbon plate and formed into a plate shape. Then, the resultant was optically polished. Various properties of the obtained glass were evaluated.

The β-OH value was determined from the above Equation 1 by measuring the transmittance of glass by FT-IR.

TABLE 1

| | | Example | | | | |
|---|---|---|---|---|---|---|
| | | No. 1 | No. 2 | No. 3 | No. 4 | No. 5 |
| Glass composition (mass %) | $SiO_2$ | 57.3 | 57.3 | 57.3 | 57.3 | 57.3 |
| | $Al_2O_3$ | 13 | 13 | 13 | 13 | 13 |
| | $Na_2O$ | 14.5 | 14.5 | 14.5 | 14.5 | 14.5 |
| | $K_2O$ | 4.9 | 4.9 | 4.9 | 4.9 | 4.9 |
| | $B_2O_3$ | 2 | 2 | 2 | 2 | 2 |
| | MgO | 2 | 2 | 2 | 2 | 2 |
| | CaO | 2 | 2 | 2 | 2 | 2 |
| | $ZrO_2$ | 4 | 4 | 4 | 4 | 4 |
| | $SnO_2$ | 0.3 | 0.3 | 0.3 | 0.3 | 0.3 |
| | $Sb_2O_3$ (ppm) | 800 | 800 | 800 | 800 | 800 |
| | $TiO_2$ (ppm) | 150 | 150 | 150 | 150 | 150 |
| | Cl (ppm) | 200 | 200 | 200 | 200 | 200 |
| β-OH ($mm^{-1}$) | | 0.36 | 0.42 | 0.55 | 0.62 | 0.68 |
| Strain point (° C.) | | 516 | 515 | 508 | 505 | 502 |
| Annealing point (° C.) | | 556 | 555 | 548 | 545 | 542 |
| Softening point (° C.) | | 758 | 752 | 746 | 743 | 740 |
| $10^4$ dPa·s (° C.) | | 1098 | 1093 | 1092 | 1089 | 1086 |
| $10^3$ dPa·s (° C.) | | 1278 | 1274 | 1273 | 1270 | 1267 |
| $10^{2.5}$ dPa·s (° C.) | | 1395 | 1391 | 1391 | 1388 | 1385 |
| Density (g/$cm^3$) | | 2.54 | 2.54 | 2.54 | 2.54 | 2.54 |
| α ($\times 10^{-7}$/° C.) | | 100 | 100 | 100 | 100 | 100 |
| Liquidus temperature (° C.) | | 860 | 860 | 860 | — | — |
| Liquidus viscosity (dPa·s) | | $10^{6.1}$ | $10^{6.1}$ | $10^{6.0}$ | — | — |
| Young's modulus (GPa) | | 75 | — | — | — | — |
| Compression stress value (MPa) | | 740 | 740 | 740 | — | — |
| Depth of compression stress layer (μm) | | 65 | 63 | 60 | — | — |

TABLE 2

| | | Example | | |
|---|---|---|---|---|
| | | No. 6 | No. 7 | No. 8 |
| Glass composition (mass %) | $SiO_2$ | 56.5 | 57.5 | 62.9 |
| | $Al_2O_3$ | 14 | 16 | 15 |
| | $Na_2O$ | 14.5 | 14.5 | 13 |
| | $K_2O$ | 4.9 | 4.9 | 5 |
| | $B_2O_3$ | 2 | 1 | 1 |
| | MgO | 3 | 3 | 3 |
| | CaO | 1 | 1 | — |
| | $ZrO_2$ | 4 | 2 | — |
| | $SnO_2$ | 0.1 | 0.1 | 0.1 |
| | $Sb_2O_3$ (ppm) | 50 | 200 | 50 |
| | $TiO_2$ (ppm) | 200 | 100 | 100 |
| | Cl (ppm) | 100 | 100 | 100 |
| β-OH ($mm^{-1}$) | | 0.52 | 0.58 | 0.55 |
| Strain point (° C.) | | 518 | 530 | 519 |
| Annealing point (° C.) | | 559 | 572 | 564 |
| Softening point (° C.) | | 762 | 779 | 785 |
| $10^4$ dPa·s (° C.) | | 1111 | 1137 | 1177 |
| $10^3$ dPa·s (° C.) | | 1290 | 1325 | 1387 |
| $10^{2.5}$ dPa·s (° C.) | | 1405 | 1445 | 1521 |
| Density (g/$cm^3$) | | 2.54 | 2.51 | 2.45 |
| α ($\times 10^{-7}$/° C.) | | 100 | 100 | 94 |
| Compression stress value (MPa) | | 875 | 834 | 748 |
| Depth of compression stress layer (μm) | | 64 | 66 | 75 |

Each sample in the tables were prepared as follows. First, a glass batch or the like was prepared (for example, the ratio of an oxide raw material to an hydroxide raw material as $Al_2O_3$ The strain point and the annealing point are values measured based on a method of ASTM C336.

The softening point is a value measured based on a method of ASTM C338.

Temperatures corresponding to viscosities $10^4$ dPa·s, $10^3$ dPa·s, and $10^{2.5}$ dPa·s are values measured by a platinum sphere pull up method.

The density is a value measured by a known Archimedes method.

The thermal expansion coefficient is a value measured by a dilatometer and shows an average value in the temperature range of 30 to 380° C.

The liquidus temperature is a value obtained by measuring a temperature at which a glass is pulverized, a glass powder which passes through a standard sieve of 30 mesh (mesh opening 500 μm) and remaining on 50 mesh (mesh opening 300 μm) is placed in a platinum boat, and kept in a temperature gradient furnace for 24 hours, to thereby deposit crystals.

The liquidus viscosity is a value obtained by measuring the viscosity of glass at a liquidus temperature by a platinum ball pull up method.

The obtained glass was immersed in a $KNO_3$ tank maintained at 440° C. for 8 hours and an ion exchange treatment was performed. After the ion exchange treatment, the compression stress value and the thickness of a compression stress layer was measured. The compression stress value and the thickness of the compression stress layer were calculated by observing the number of interference fringes and the intervals of the interference fringes using a surface stress meter (FSM-6000 manufactured by TOSHIBA Corporation). A refractive index was set to 1.52 and a photo elastic constant was set to 28 [(nm/cm)/MPa] for each sample upon calculation.

As apparent from tables 1 and 2, a softening point is lowered with the increase in β-OH value, to thereby improve heat processability. As a result, a tempered glass having a specific shape can be easily obtained.

Note that, in preparing each samples in the tables, a molten glass was flown, formed into a plate shape, and then the glass was optically polished before the ion exchange treatment, for convenience of explanation of the present invention. In the case of producing tempered glass in an industrial scale, it is preferred that a plate-shaped glass be formed by an overflow down-draw method and the like and omit the polishing treatment, and it is more preferred that an ion exchange treatment be carried out after the glass is heat processed into a specific shape.

INDUSTRIAL APPLICABILITY

The tempered glass of the present invention can be used for cover glasses for a mobile phone, a digital camera, a PDA, a touch panel display, and the like, and is suitably used, by taking advantage of its characteristics of excellent thermal processability, for exterior parts for a mobile phone, a mobile PC, a pointing device, and the like, in particular, for exterior parts having a shape other than a plate shape. Further, the tempered glass of the present invention can be expected to find applications requiring a high mechanical strength, for example, window glasses, substrates for a magnetic disk, substrates for a flat panel display, substrates and cover glasses for a solar battery, cover glasses for a solid-state imaging device, and tableware, in addition to the above-mentioned applications.

The invention claimed is:

1. A tempered glass having a compression stress layer on a surface thereof, the compression stress layer being formed by an ion exchange treatment, wherein the tempered glass comprises, as a glass composition, in terms of mass %, 45 to 75% of $SiO_2$, 0 to 30% of $Al_2O_3$, and 0.1 to 30% of $Li_2O+Na_2O+K_2O$ and having a β-OH value of 0.3 to 1 /mm, and wherein the tempered glass has a shape other than a flat plate shape, which is formed by subjecting a glass comprising the glass composition and having a flat plate shape to a thermal processing.

2. The tempered glass according to claim 1, wherein the glass having a flat plate shape is formed by an overflow down-drawn method.

3. The tempered glass according to claim 1, further comprising, as the glass composition, 0 to 5 mass % of $B_2O_3$.

4. The tempered glass according to claim 1,
wherein the compression stress layer has a compression stress value of 50 MPa or more and a thickness of 10 μm or more.

5. The tempered glass according to claim 1, which has a softening point of 900° C. or less.

6. The tempered glass according to claim 1, which has a strain point of 400° C. or more.

7. The tempered glass according to claim 1, which has a liquidus temperature of 1200° C. or less.

8. The tempered glass according to claim 1, which has a liquidus viscosity of $10^4$ dPa·s or more.

9. The tempered glass according to claim 1, which has a thermal expansion coefficient of 50 to $110 \times 10^{-7}$/° C.

10. The tempered glass according to claim 1, wherein the tempered glass has a curved shape portion.

11. The tempered glass according to claim 1, wherein the tempered glass has a stepped shape portion.

12. The tempered glass according to claim 1, wherein the tempered glass has an unpolished surface.

* * * * *